United States Patent
Stemmermann et al.

(10) Patent No.: US 7,807,078 B2
(45) Date of Patent: Oct. 5, 2010

(54) METHOD FOR PRODUCING COMPONENTS

(75) Inventors: Peter Stemmermann, Karlsruhe (DE); Krassimir Garbev, Eggenstein-Leopoldshafen (DE); Guenter Beuchle, Karlsruhe (DE); Uwe Schweike, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 526 days.

(21) Appl. No.: 11/912,186

(22) PCT Filed: Mar. 24, 2006

(86) PCT No.: PCT/EP2006/002696

§ 371 (c)(1),
(2), (4) Date: Oct. 22, 2007

(87) PCT Pub. No.: WO2006/111241

PCT Pub. Date: Oct. 26, 2006

(65) Prior Publication Data

US 2008/0093774 A1    Apr. 24, 2008

(30) Foreign Application Priority Data

Apr. 21, 2005    (DE) .................. 10 2005 018 423

(51) Int. Cl.
*B29C 43/02* (2006.01)
(52) U.S. Cl. .................. 264/115; 264/109; 264/123; 264/DIG. 25; 264/DIG. 35
(58) Field of Classification Search .............. None
See application file for complete search history.

(56) References Cited

U.S. PATENT DOCUMENTS

| 4,490,320 | A | | 12/1984 | Oguri et al. | |
| 5,810,922 | A | * | 9/1998 | Okamoto et al. | 106/714 |
| 2005/0274516 | A1 | * | 12/2005 | Nelson et al. | 166/276 |
| 2007/0277472 | A1 | * | 12/2007 | Sinclair | 52/605 |

FOREIGN PATENT DOCUMENTS

| DE | 2832125 | 1/1980 |
| DE | 3302729 | 8/1983 |
| JP | 58135120 | 8/1983 |

(Continued)

OTHER PUBLICATIONS

Fumio Saito et al., "Mechanochemical synthesis of hydrated calcium silicates by room temperature grinding", Solid State Iconics, North Holland Pub. Company Amsterdam, NL, vol. 101-103, Nr. 2001, Nov. 1997, pp. 37-43, XP004103620.

(Continued)

*Primary Examiner*—Mary Lynn F Theisen
(74) *Attorney, Agent, or Firm*—Leydig, Voit & Mayer, Ltd.

(57) ABSTRACT

A method for producing components including preparing an aqueous suspension of solids including calcium oxide CaO and silicon dioxide SiO2 with a molar ratio of Ca:Si that is between 0.5:1.0 and 2.5:1.0. Nanocrystalline C—S—H phases are produced by grinding the aqueous suspension and keeping its temperature at or below 100° C. The aqueous phase is separated out from the suspension to form a residue containing the nanocrystalline C—S—H phases. The residued is removed and a powdery product is made by drying the residue. A mold is filled with the powdery product and pressure is applied to form the component. The component is removed from the mold.

17 Claims, 1 Drawing Sheet

FOREIGN PATENT DOCUMENTS

JP          05124877          5/1993

OTHER PUBLICATIONS

Showa Denko K. K., "Porous calcium silicate products with improved sound absorbation", Chemical Abstracts + Indexes, American Chemical Society, Columbus, US, vol. 88, No. 16, Apr. 17, 1978, p. 279, XP000188795.

Nippon Isulation K. K., "Shaped calcium silicate articles for thermal insulators and building materials", Chemical Abstract + Indexes, American Chemical Society, Columbus, US, vol. 114, No. 8, Feb. 24, 1991, p. 381, XP000192686.

S. Goni et al., "Activation of the fly ash pozzolanic reaction by hydrothermal conditions", Cement and Concrete Research 33, 2003, pp. 1399-1405.

S. C. Mojumdar et al., Synthesis, Moisture Resistance, Thermal, Chemical and SEM Analysis of Marco-Defect-Free (MDF) Cements, Journal of Thermal Analysis and Calorimetry, vol. 78, 2004, pp. 135-144.

George R. Gouda et al., "Characterization of Hot-Pressed Cement Pastes", Journal of the American Ceramic Society, vol. 59, No. 9-10, 1976, pp. 412-414.

Guomin Mi et al., "Mechanochemical synthesis of tobermorite by wet grinding in a planetry ball mill", Powder Technology, vol. 93, 1997, pp. 77-81.

Paschenko A.A. et al., Formation of the Structure of Hot-Pressed Cement Paste, Dopo-vidi Akademii Nauk Ukrainskoi RSR, Seriya B, Geologichni Khimichni ta Biologichni Nauki 9, 1990, p. 41 (abstract).

* cited by examiner a)

b)

METHOD FOR PRODUCING COMPONENTS

CROSS REFERENCE TO PRIOR RELATED APPLICATION

This is a U.S. National Phase application under 35 U.S.C. §371 of International Application No. PCT/EP2006/002696, filed Mar. 24, 2006 and claims the benefit of German Patent Application No. 10 2005 018 423.5, filed Apr. 21, 2005. The International Application was published in German on Oct. 26, 2006 as WO 2006/111241 under PCT Article 21(2)

FIELD OF THE INVENTION

The present invention relates to a method for producing components based on calcium silicate hydrates, which are also described as C—S—H phases.

BACKGROUND

Components (shaped parts), in which hardened cement paste, whose constituents include C—S—H phases, assume the function of a binding agent, are typically produced in three steps:
1. The starting materials cement, aggregates and water are mixed (so-called tempering).
2. This mixture, which is described as cement paste, fresh mortar or fresh concrete, is poured into a mold and mostly mechanically vibration-compacted.
3. The component cures for a length of time until the surrounding mold can be removed.

It is important in this context that the composition of the mixture be such that a suitable consistency during processing and a long enough workability are ensured. In the same way, the composition of the mixture or the curing thereof must be such that, once the reaction with water has taken its course, the requisite final strength is obtained.

The three mentioned steps are carried out in cement-containing systems by a coordinated reaction of the cement constituents. CEM I (Portland cement) includes a mixture of two groups of minerals, which each perform a function:
1. calcium silicates, whose hydration products are responsible for the final strength of the shaped part; and
2. calcium aluminates, calcium aluminate ferrates and calcium sulfates, which control the workability and the early strength.

In addition, other inorganic and organic substances can be added, for example, to compact the structure, improve workability or enhance strength.

The following disadvantages are associated with the described approach:
 Producing cement-containing binding agents requires high temperatures (for example, 1450° C. for CEM I), thereby entailing high energy costs.
 Only some of the phases which build up the binding agent (approximately 50% for CEM 1, for instance) contribute to the final strength of the component.
 Approximately 50% of the calcium carbonate used to produce CEM 1 is neutralized in a process that entails considerable expenditure of energy and that does not contribute to the later strength in the component. This pollutes the environment with $CO_2$ emissions.
 To obtain the requisite reactivity for the product, the cement calcination is followed by a grinding process that is costly in terms of energy usage.
 Calculating the mixture proportions is a complex process that is based on experience. Variations in raw material qualities make it necessary to constantly adjust the mixture proportions.
 Special additives used in the mixtures are expensive.
 Only a precisely defined period of time is available for the processing. Interrupting the processing is only possible to a very limited extent.
 The strength of the mixture increases following the processing thereof only over a long period of time.
 The chemical properties of the phases formed during mixing vary and, therefore, are not able to be optimally adapted to the aggregates used.
 It often takes months before the final strength is reached.
 The final strength is reduced by a high porosity, a low particle-to-particle bonding, and by a reduction in the proportion of strength-determining phases.
 The shaped parts have limited stability under external chemical attack, for example by acids, $CO_2$, or sulfates.

S. Goni, A. Guerrero, M. P. Luxan and A. Macias, *Activation of the Fly Ash Pozzolanic Reaction by Hydrothermal Conditions*, Cement and Concrete Research 33, pp. 1399-1405, 2003 describes producing low-calcium fly ash belite cement from fly ash using a two-step process. To this end, a hydrothermal treatment of the fly ash is first carried out under saturated water-vapor partial pressure at 200° C., and a calcination is subsequently performed at 700° C. Following preparation, the fly ash belite cement is tempered with water and processed in a conventional manner. The energy costs are significantly reduced in comparison to the production of Portland cement, however, the process requires neutralizing a higher proportion of $CaCO_3$ than during production of the strength-determining phase, thereby additionally polluting the environment with $CO_2$. Only some of the phases which build up the binding agent contribute to the final strength of the component since fly ash belite cement contains calcium aluminates and calcium aluminum ferrates, in the same way as CEM I. On the other hand, the grinding costs are lower than in the case of conventional CEM 1. Fly ash is available on only a limited basis and is comparatively expensive. Since fly ash belite cement is further processed in the conventional manner, it is not suited for overcoming the remaining disadvantages mentioned above.

In *Synthesis, Moisture Resistance, Thermal, Chemical and SEM Analysis of Macro-Defect-Free (MDF) Cements*, Journal of Thermal Analysis and Calorimetry 78, pp. 135-144, 2004, S. C. Mojumdar, B. Chowdhury, K. G. Varshnney and K. Mazanec discuss producing macro-defect-free cement (MDF) by blending various clinker materials, such as SAFB, CEM I or $Al_2O_3$, with other inorganic and organic additives. MDF cements are tempered in a conventional manner, but using a greatly reduced water/solid ratio, and processed.

G. R. Gouda and D. M. Roy, *Characterization of Hot-Pressed Cement Pastes*, Journal of the American Ceramic Society 59, pp. 412-414, 1976, and A. A. Paschenko, V. V. Chistyakov, E. A. Myasnikova and L. A. Kulik, *Formation of the Structure of Hot-Pressed Cement Paste*, Dopo-vidi Akademii Nauk Ukrainskoi RSR, Seriya B, Geologichni Khimichni ta Biologichni Nauki 9, p. 41 (abstract), 1990 both describe production of hot-pressed cement paste by curing cement pastes, which have been tempered with water and processed in the conventional manner, at an elevated pressure (3-5 kbar) and elevated temperature (150-250° C.).

Both the structure of the MDF cements, as well as of the hot-pressed cement pastes, is denser than that of conventional CEM I and does not include macropores. However, in the micrometer range, the primary porosity is considerable. The final strength is not obtained until after immersion in water and is greatly increased over CEM I (up to 700 N/mm² in the case of hot-pressed cement pastes). The stability under external chemical attack, for example by acids, $CO_2$ or sulfates, is improved over CEM I due to the denser structure. However, in the case of these products, there is the risk of so-called swelling due to unreacted clinker phases. Neither MDF cements nor hot-pressed cement pastes are capable of overcoming the other disadvantages enumerated above.

G. Mi, F. Saito and M. Hanada, *Mechanochemical Synthesis of Tobermorite by Wet Grinding in a Planetary Ball Mill*, Powder Technology, volume 93, pp. 77-81, 1997 describes production of the C—S—H phase tobermorite by what is termed the mechanochemical treatment of an aqueous suspension of CaO and $SiO_2$ in an agate ball mill grinder.

The German Patent 28 32 125 C2 describes a method which provides for mixing CaO- and $SiO_2$-containing materials with a synthetic calcium silicate ($CaO:SiO_2$ ratio, in each case 0.8 to 1.1) and for working in fibers in the presence of water. Following a delay time of at least five hours ("pre-reaction"), a pumpable paste is formed since the sedimentation tendency is prevented by stirring, and the paste is poured into plate-shaped molds and dewatered under pressure. Following an autoclave curing and drying, "fire-resistant, dimensionally accurate lightweight building slabs" are obtained. The calcium silicate is synthetically derived and is produced by autoclave curing.

The German Patent Application DE 33 02 729 A1 describes the conversion of water-dispersed starting materials under heating and subsequent filter pressing (dewatering forming), subsequent steam curing and subsequent drying. The conversion (heating) takes place at a temperature of 80 to 230° C. within 30 minutes to 10 hours.

SUMMARY OF THE INVENTION

An aspect of the present invention is to devise a method for producing shaped parts that will overcome the aforementioned disadvantages and limitations.

The present invention provides a method for producing components including preparing an aqueous suspension of solids including calcium oxide CaO and silicon dioxide $SiO_2$ with a molar ratio of Ca:Si that is between 0.5:1.0 and 2.5:1.0. Nanocrystalline C—S—H phases are produced by grinding the aqueous suspension and keeping its temperature at or below 100° C. The aqueous phase is separated out from the suspension to form a residue containing the nanocrystalline C—S—H phases. The residued is removed and a powdery product is made by drying the residue. A mold is filled with the powdery product and pressure is applied to form the component. The component is removed from the mold.

BRIEF DESCRIPTION OF THE DRAWINGS

The invention will be explained further with respect to an exemplary embodiment and drawings, in which.

DETAILED DESCRIPTION

The present invention is based on the synthesis of calcium silicate hydrates (C—S—H phases) in aqueous solution or suspension having a layered structure. In an embodiment, the method according to the present invention actually produces a layered structure of this kind may be observed using X-ray structural analysis since, as soon as a structure of this kind exhibits regular spacing, it leaves behind a so-called basal reflex in the X-ray diffractogram. In the case of the C—S—H phases in question, a line that is indicative of the formation of this layered structure forms within the 9 Å to 20 Å region.

In an embodiment, the present invention utilizes the formation of an electrical double layer at the interface between a solid and a liquid phase. At the surface of the solid, a rigid layer of ions is formed behind which a diffuse charge cloud of ions attaches itself. The electric potential, which is referred to as zeta or electrokinetic potential, initially drops off considerably in terms of absolute value within the rigid layer, to then either continue to fall slightly (positive zeta potential) or to increase slightly (negative zeta potential) in the subsequent liquid phase. The zeta potential, whose absolute value is expressed by the relation

$\eta$ being the viscosity of the liquid, v its velocity, or $\epsilon_r$ its relative permittivity and E the electric field, is a measure of the ion mobility.

Figure 1:
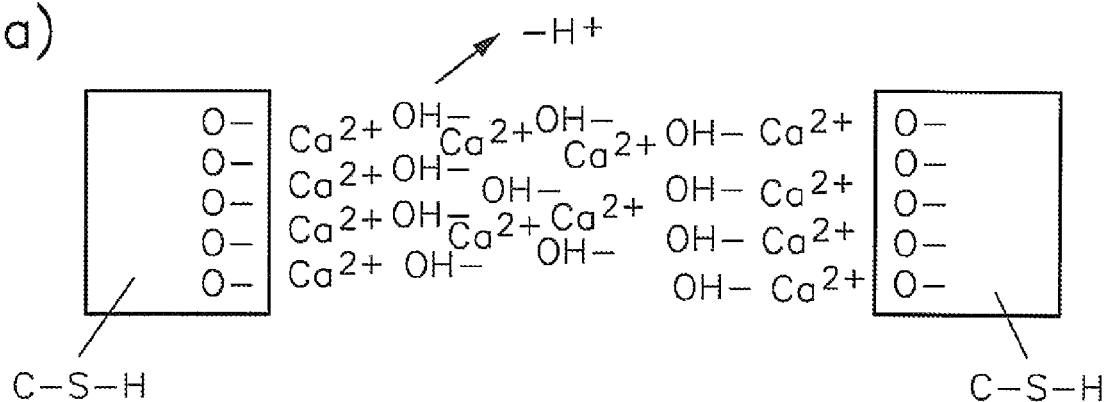
FIG. 1a illustrates ratios of calcium silicate hydrates (C—S—H phases) having a ratio of $CaO/SiO_2>1$ and a positive zeta potential.
FIG. 1b illustrates the calcium silicate hydrates shown in FIG. 1a with external pressure applied.
Figure 1:
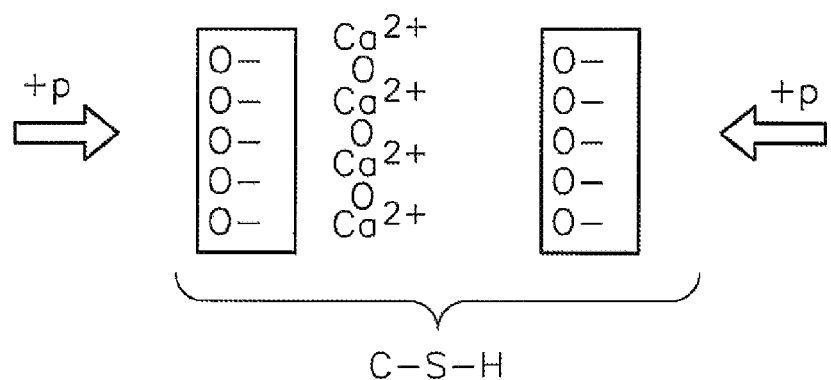

The described ratios are illustrated in FIG. 1a) for the case of calcium silicate hydrates (C—S—H phases) having a ratio of $CaO/SiO_2>1$ and a positive zeta potential. The surface of the solid is preferably made up of negatively charged $O^{2-}$ ions, so that a rigid layer of $Ca^{2+}$ ions forms in the solution that is adjacent thereto. A diffuse layer of $OH^-$ and $Ca^{2+}$ ions attaches itself here. The surface-remote solution is electrically neutral.

Utilizing these charge layers, similar solids or surfaces may approach one another in response to the action of external pressure, as illustrated in FIG. 1b). The diffuse charge layers are displaced toward the surface-remote solution, while the rigid layers reorganize themselves to form a bonding layer between the mutually approaching surfaces. The requisite charge equalization is effected by mobile protons as expressed by the equation $$H_2O \longleftrightarrow H^+ + OH^- \longleftrightarrow 2H^+ + O^{2-}.$$

Suitable additives modify the interfaces or boundary layers, primarily by acting as seed crystals having controllable properties for self-organizing aggregates within the size range of up to 1 μm. This process was substantiated by surface analyses.

For the method for producing components according to the present invention, an aqueous solution of calcium oxide CaO and silicon dioxide $SiO_2$ is first prepared. In this connection, the molar ratio of calcium to silicon (Ca:Si) assumes a value within the range of between 0.5:1.0 to 2.5:1.0, preferably of between 0.5:1.0 to 1.0:1.0, the maximum values being included therein in each case. At a value above 1.3:1.0, calcium hydroxide $Ca(OH)_2$ is produced simultaneously in the $CaO—SiO_2—H_2O$ system, with the result that a component that is otherwise produced in accordance with the present invention no longer has sufficient strength.

The water to solid ratio in the production of the C—S—H phases is freely selectable within a broad range. The water content is preferably 4-20 times, especially nearly 10 times the total weighed portion of the solids.

To produce calcium silicate hydrates, burnt lime CaO or calcium hydroxide-containing slurry is preferably used as raw material. As a silicate source, preferably Aerosil, silicic acid (pyrogenic or precipitated), kieselgur, sodium silicate solutions, industrial by-products, such as microsilica from ferrosilicon production, slag from refuse incineration or blast furnace processes, granulated blast-furnace slag or fly ash are used.

The thus prepared solution is then mixed and caused to react. In this context, it is crucial that the temperature not be raised above 100° C., preferably not above 80° C. To improve the conversion or to obtain a superior homogeneity, grinding aids or processes for improving intermixing (known as mechanochemical treatment) are used during synthesis. It is difficult to measure the temperature, since it is a question of local temperatures occurring in the contact region of the grinding jar/grinding aid suspension, and substantial temperature gradients are indicated. In the implementation, the grinding process is periodically interrupted to allow temperature equalization, respectively cooling, as the case may be. The synthesis is preferably carried out at room temperature. To shorten the duration of synthesis, thus to accelerate the reaction, the operation is carried out at slightly elevated temperatures or pressures. The reaction is ended once nanocrystalline material has formed, which is indicated by a basal reflex appearing in the X-ray diffractogram.

Subsequently thereto, the remaining aqueous phase is separated out (for example removed by filtration), whereby nanocrystalline material remains, which is removed and dried into powder form. Thus, the solid product is separated out from the suspension water, and dried, whereby a flowable, storable powder is obtained that is not subjected to any further temperature or water vapor pressure treatment.

This dried powder is then poured into a prepared mold, either immediately or following interim storage. In response to pressurization, preferably between 50 MPa and 500 MPa, especially between 100 MPa and 200 MPa, the dried powder is compacted into a solid component without requiring any subsequent temperature treatment. In the process, the nanocrystalline C—S—H phases are bonded together by a self-healing process. At the same time, pores larger than approximately 1 μm are closed in the process.

To produce a larger component, this method step may also be carried out repeatedly. To this end, it is advantageous to pour the dried powder in layers into the prepared mold, for example.

Once the component has been created in its entirety, the mold is removed. The component remains either at the location or, if indicated, is taken to another site for use thereof.

In one embodiment, the solution is mixed during or subsequently to preparing the aqueous solution, or the powder subsequently removing the residue, with different additives and/or aggregates, and homogenized. For one thing, additives are mineral substances, such as calcite, wollastonite or aluminum oxide and fibrous materials. This possible addition of fillers aids in optimizing the mechanical properties or, in the case of heat-insulating materials, in influencing the sound-insulating properties of the component. On the other hand, organic and inorganic additives may also be used to modify the surface charge of the phases involved, in particular of the C—S—H phases. An especially appropriate additive is aluminum hydroxide $Al(OH)_3$, which may be added in excess and lead to the self-organization of C—S—H phases having negative zeta potential and $Al(OH)_3$ (positive zeta potential). Other suitable additives are sulfurous compounds, such as $CaSO_4$ modifications (plaster) or ettringite, as well as hydroxides, such as brucite or portlandite.

The binding agent, which is produced by the method according to the present invention and is composed of C—S—H phases, respectively C—S—H phases, including additives, permanently encloses the aggregates. By properly selecting the chemical properties of the nanocrystalline C—S—H phases and of the aggregates, the binding agent is permanently bonded to the aggregates. The bond between the binding agent and the aggregates may be improved by adapting the surface charge of the aggregates, through a prior chemical treatment using acid, for instance. This process step may be supplemented by a temperature application.

The method according to the present invention may exhibit any of the following advantages:

Simple raw material composition.

The method proceeds already at room temperature; higher temperatures are optional.

All of the material, and not just some of the phases that build up the binding agent contribute to the strength.

The shaping process is carried out simply by application of an external pressure.

The components produced in the process immediately solidify, thereby allowing immediate stripping of the formwork forms.

The density of the material produced in accordance with the present invention may be adjusted by properly selecting the substances, the drying condition, and the level of the pressure applied to the powder during the compacting of the mold.

Already at a density of 1.2 $g/cm^3$, the tensile splitting strength of the product produced using the method of the present invention corresponds to the tensile splitting strength of self-compacting concrete, which has a density of 2.3 $g/cm^3$.

The conditions existing during powder production (composition, synthesis conditions) may be established on the basis of demands placed on the component, such as on the chemical resistance thereof, and must not be defined on the basis of the requisite reaction conditions. A substantial material savings is derived from this advantage.

The component's shape is determined by the function thereof and by demands placed on the strength thereof, and not by flow and reaction conditions.

Because of the predictable chemical processes, it is a substantially simpler process to calculate the mixture ratios.

The density of the material may also be adjusted by selecting appropriate aggregates and/or additives, so that values of between 0.5 and 3.0 $g/cm^3$ are obtained. Thus, the material may also be used as lightweight structural material.

The method according to the present invention is used for synthesizing nanocrystalline cement hydrate phases or mixtures thereof having an adjusted surface charge, in particular positive zeta potential. In addition, this method is employed for producing and utilizing fully hydrated C—S—H phases having a defined composition and surface charge as a basic substance for producing binding agents. Finally, this method is employed for producing and utilizing fully hydrated, dried cement hydrates as a basic substance for binding a cement-bound component.

The present invention is explained in greater detail in the following with reference to exemplary embodiments.

Producing the Powdery Product

As starting materials for the basic system C—S—H, one used:

$SiO_2$ in the form of Aerosil;

CaO, freshly burned from $CaCO_3$, cooled under protective gas;

Boiled, bidistilled $H_2O$.

Moreover, as additives, one partially used:

$Al_2O_3$ in the form of aluminum hydroxide $Al(OH)_3$;

$CaSO_4$.

In each instance, 15 g of nanocrystalline CSH phases having compositions corresponding to the molar ratios CaO/SiO$_2$=0.5, 0.66, 0.75, 1.0 or 1.5, were produced. The synthesis was carried out by the mechanochemical treatment of an aqueous suspension of CaO and SiO$_2$ in an agate ball mill grinder. The stoichiometrically weighed oxides were mixed in deionized water in a ratio of water/solid=10, values of between approximately 4 and 12 likewise being suited, and ground for 48 hours at 600 revolutions per minute. Following 30 minutes of grinding, the mill grinder was stopped each time for 15 minutes to avoid overheating of the specimen. The substance (slurry) produced in this manner was dried for four days at 60° C. If the need arises, a filtration step may be performed prior to the drying operation. All method steps, i.e., weighing, mixing, loading and unloading the mill grinders, and drying, took place under N$_2$ atmosphere in what is known as a "glove box," in order to create controlled ambient conditions and, in particular, to exclude CO$_2$.

The following Table 1 shows an overview of five preparations for the basic system C—S—H (ratio water/solid 10):

| Molar ratio CaO/SiO$_2$ | Mole percent CaO | Percentage by weight CaO | Mole percent SiO$_2$ | Percentage by weight SiO$_2$ |
|---|---|---|---|---|
| 1.500 | 60.0 | 58.33 | 40.0 | 41.7 |
| 1.250 | 55.6 | 53.85 | 44.4 | 46.2 |
| 1.200 | 54.5 | 52.83 | 45.5 | 47.2 |
| 1.000 | 50.0 | 48.28 | 50.0 | 51.7 |
| 0.830 | 45.4 | 43.65 | 54.6 | 56.3 |
| 0.750 | 42.9 | 41.18 | 57.1 | 58.8 |
| 0.660 | 39.8 | 38.12 | 60.2 | 61.9 |
| 0.500 | 33.3 | 31.82 | 66.7 | 68.2 |

The following Table 2 shows an overview of three preparations for the system C-A-S—H including Al$_2$O$_3$ as an additive (ratio SiO$_2$/Al$_2$O$_3$=5.93; ratio water/solid=10):

| | Starting substances | | | | | |
|---|---|---|---|---|---|---|
| | CaO (M = 56.08) | | SiO$_2$ (M = 60.09) | | Al$_2$O$_3$ (M = 101.96) | |
| Molar ratio CaO/[SiO$_2$ + Al$_2$O$_3$] | Mole percent | Percentage by weight | Mole percent | Percentage by weight | Mole percent | Percentage by weight |
| 1.50 | 62.3 | 58.3 | 32.3 | 32.4 | 5.4 | 9.2 |
| 1.00 | 52.4 | 48.3 | 40.8 | 40.2 | 6.9 | 11.5 |
| 0.66 | 42.3 | 38.4 | 49.4 | 48.0 | 8.3 | 13.7 |

Moreover, the ratios of CaO/SiO$_2$, SiO$_2$/Al$_2$O$_3$ and of water/solid may be varied. It is equally possible for other additives, such as Mg(OH)$_2$ or CaSO$_4$, to be added.

The phase composition of the specimens was characterized based on the consistency of the powder material, using X-ray diffraction, which aids in ascertaining the qualitative and quantitative composition of the specimens, as well as by thermogravimetry for determining the water content of the specimens.

Producing the Component

For test purposes, components (test specimens) in the form of tablets having a diameter of approximately 1.3 cm were subsequently produced from the powders. Quantities of 300 to 500 mg were weighed in for the tablets. The powder was subjected in each case in a vacuum press tool to a force of 20 kN (values of between 10 kN and 120 kN are possible), which, at the mentioned diameter, corresponds to a pressure of approximately 140 MPa.

The following Table 3 shows the data pertaining to series of pressed tablets of pure C—S—H phases having a different CaO/SiO$_2$ ratio, respectively after additionally adding Al(OH)$_3$, which significantly enhances the strength:

| C/S ratio of the starting material (number of compacts) | Density [mg/mm$^3$] | Tensile splitting strength [Mpa] |
|---|---|---|
| 0.66 (5) | 0.90 | 4.19 |
| 0.66 (8) | 0.97 | 5.19 |
| 0.75 (10) | 1.18 | 8.79 |
| 0.75 (9) | 0.99 | 6.16 |
| 0.83 (9) | 0.99 | 7.84 |
| 0.83 (9) | 0.95 | 3.51 |
| 1.0 (2) | 1.15 | 3.73 |
| 1.0 (8) | 1.09 | 3.03 |
| 1.0 (11) | 1.04 | 2.80 |
| 1.2 (10) | 1.05 | 1.01 |
| 1.2 (10) | 1.03 | 3.02 |
| 1.25 (10) | 1.14 | 1.14 |
| 1.5 (2) | 1.26 | 0.84 |
| AS1.5 (2) | 1.07 | 3.02 |

The tensile splitting strength was measured by applying the so-called Brazilian disk test, i.e., using a disk. Exceedance of the material strength triggers a failure due to cracking. The tensile splitting strength of concrete is 4 to 5 MPa (see, for example, self-compacting concrete at 3.98 MPa as described in the Taschenbuch für die Zementindustrie 2002, page 307) and is, thus, significantly lower than the values for the compacts of C—S—H phases where C/S is at 0.66 to 1.0.

The invention claimed is:
1. A method for producing components comprising:
   preparing an aqueous suspension of solids including calcium oxide CaO and silicon dioxide SiO2 having a molar ratio of Ca:Si that is between 0.5:1.0 and 2.5:1.0;
   producing nanocrystalline C—S—H phases by grinding the aqeuous suspension at a temperature at or below 100° C.;
   separating an aqueous phase from the aqueous suspension to form a residue containing the nanocrystalline C—S—H phases;
   removing the residue;
   forming a powdery product by drying the residue;
   filling a mold with the powdery product;
   compacting the powdery product by applying pressure to form the component; and
   removing the component from the mold.

2. The method as recited in claim 1 wherein the molar ratio of Ca:Si is between 0.5:1.0 and 1.0:1.0.

3. The method as recited in claim 1 wherein the solids containing calcium oxide include at least one of burnt lime and calcium hydroxide.

4. The method as recited in claim 2 wherein the solids containing calcium oxide include at least one of burnt lime and calcium hydroxide.

5. The method as recited in claim 3 wherein the solids containing silicon dioxide include at least one of Aerosil, silicic acid, kieselgur, sodium silicate, microsilica, granulated blast-furnace slag and slag from refuse incineration or blast furnace processes.

6. The method as recited in claim 4 wherein the solids containing silicon dioxide include at least one of Aerosil, silicic acid, kieselgur, sodium silicate, microsilica, granulated blast-furnace slag and slag from refuse incineration or blast furnace processes.

7. The method as recited in claim 1 further comprising adding an additive during at least one of preparing the aqueous suspension and removing the residue from the aqueous suspension.

8. The method as recited in claim 1 further comprising adding an additive subsequent to at least one of steps preparing the aqueous suspension and removing the residue from the aqueous suspension.

9. The method as recited in claim 7 wherein the additive comprises an aluminum-containing compound.

10. The method as recited in claim 7 wherein the additive comprises a sulfur-containing compound.

11. The method as recited in claim 8 wherein the additive comprises an aluminum-containing compound.

12. The method as recited in claim 8 wherein the additive comprises a sulfur-containing compound.

13. The method as recited in claim 9 wherein the additive further comprises a sulfur-containing compound.

14. The method as recited in claim 11 wherein the additive further comprises a sulfur-containing compound.

15. The method as recited in claim 1 wherein the pressure applied is between 50 MPa and 500 MPa.

16. The method recited in claim 1 wherein the pressure applied is between 100 MPa and 200 MPa.

17. The method as recited in claim 1 wherein the component has a density between 0.5 g/cm3 and 3.0 g/cm3.

* * * * *